(No Model.) 2 Sheets—Sheet 1.
H. A. BORRESEN.
CLASP.
No. 460,304. Patented Sept. 29, 1891.
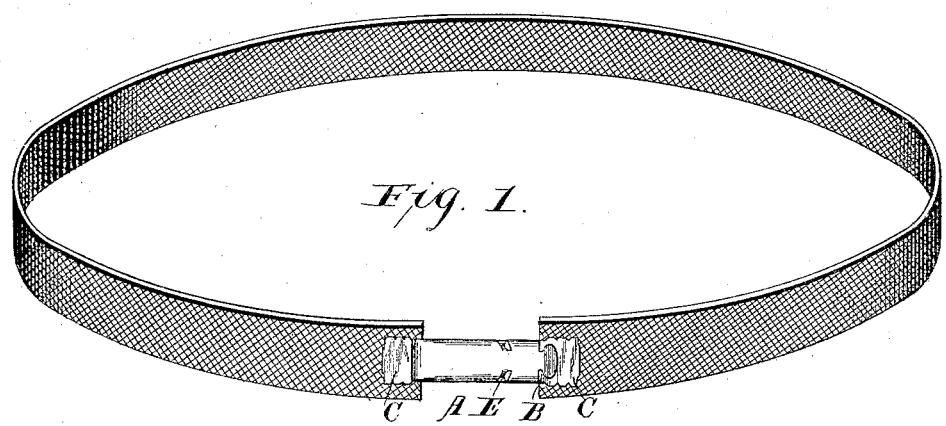
Fig. 1.
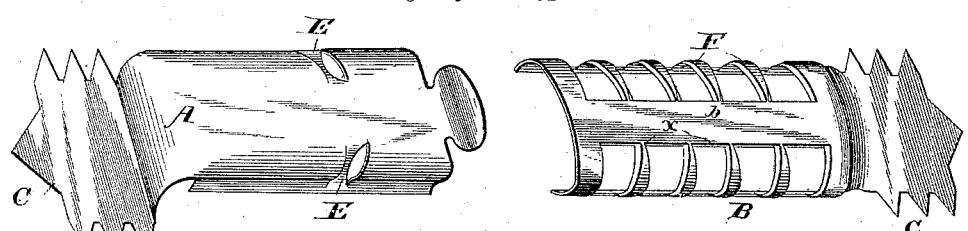
Fig. 2.
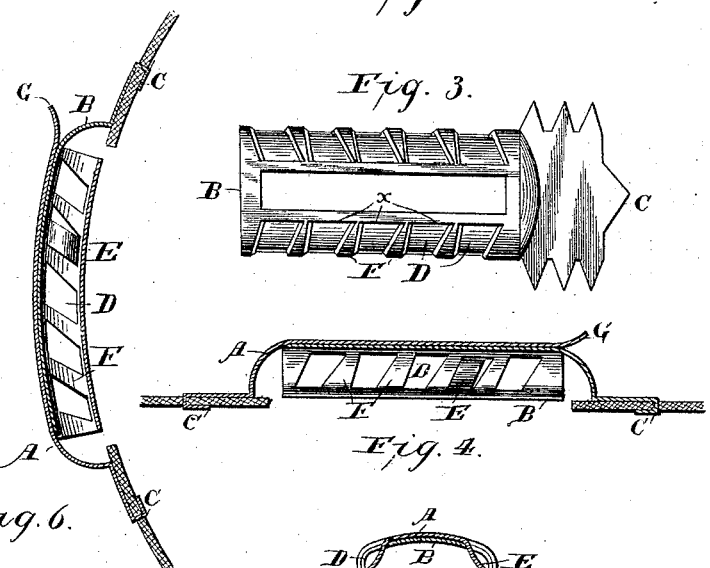
Fig. 3.
Fig. 6. Fig. 4.
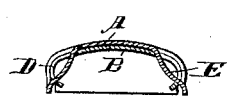
Fig. 5.
Witnesses
Louis G. Julihn
C. P. Elwell
Inventor
H. A. Borresen
By Hopkins & Atkins
Attorneys
THE NORRIS PETERS CO., PHOTO-LITHO., WASHINGTON, D. C.

(No Model.) 2 Sheets—Sheet 2.
H. A. BORRESEN.
CLASP.
No. 460,304. Patented Sept. 29, 1891.
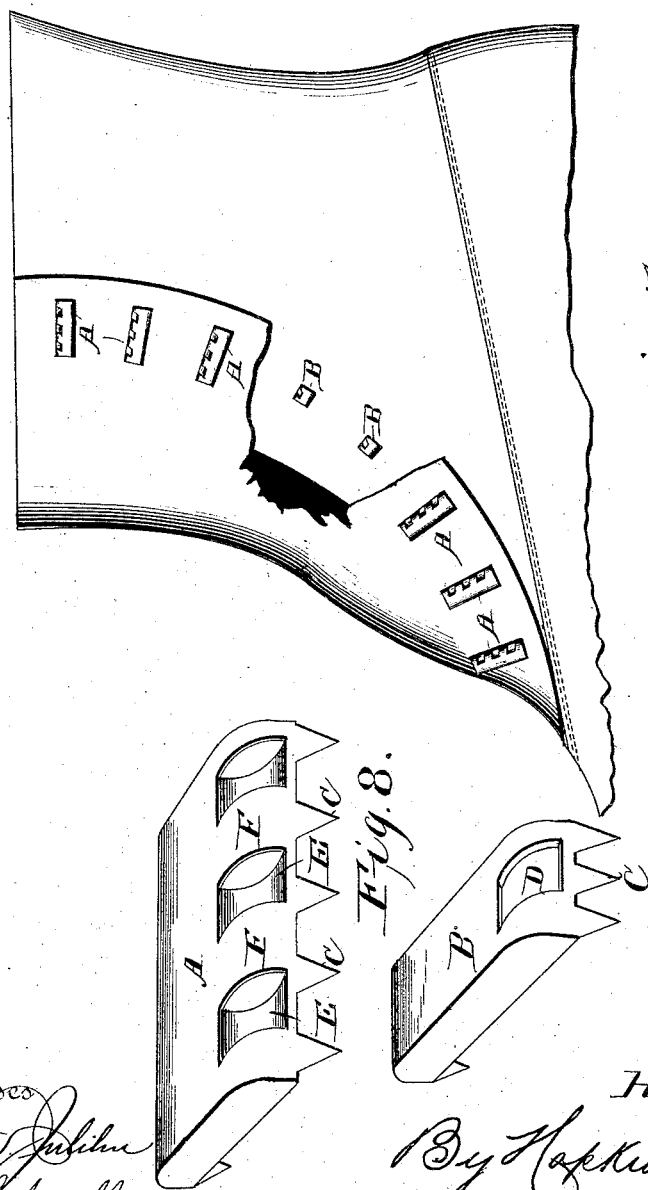
Witnesses
Inventor
H. A. Borresen.
By Hopkins & Atkins
Attorneys

UNITED STATES PATENT OFFICE.

HELGE ALFRED BORRESEN, OF ELLSWORTH, WISCONSIN.

CLASP.

SPECIFICATION forming part of Letters Patent No. 460,304, dated September 29, 1891.

Application filed November 22, 1890. Serial No. 372,323. (No model.)

*To all whom it may concern:*

Be it known that I, HELGE ALFRED BORRESEN, of Ellsworth, county of Pierce, and State of Wisconsin, have invented a certain new and useful Fastening, of which the following is a specification, reference being had to the accompanying drawings.

The object of my invention is to produce a fastening for a belt, bracelet, shoe-flap, curtain, or any other thing usually or suitable to be secured by clasps or fastenings.

My improved fastening is composed of two somewhat trough-shaped thin metallic parts, one adapted to fit within the other. Each part is adapted to be fastened to any object to be held by means of pins, hooks, or other usual attaching devices, and the two parts are adapted to be engaged by means of openings or depressions in one side or both sides of one part, and one or more lugs or projections on one side or both sides of the other part formed to fit in said openings or depressions.

In the accompanying drawings, Figure 1 is a perspective view of a belt having my improved fastening applied to its ends. Fig. 2 is a perspective view, on a larger scale, of the two parts of the fastening in juxtaposition. Fig. 3 is a plan view of one part of the fastening, modified by omitting the longitudinal rib. Fig. 4 is a longitudinal section of the parts in engagement. Fig. 5 is a transverse section of the parts in engagement. Fig. 6 illustrates a curved form of my fastening in sections. Fig. 7 shows my fastening applied to the flaps of a shoe. Fig. 8 shows my fastening having an opening or depression and corresponding lugs or projections on one side only of each part. This form is desirable for use in some cases, as, for instance, on shoes and corsets, so that a pull in one direction may disengage several fastenings.

Referring to the letters on the drawings, A indicates what I will term the "outer" part of the fastening, and B the "inner" part.

C indicates pins or hooks, which may be employed to fasten each part to any object, as, for example, the ends of a belt or bracelet, the flaps of a shoe, or parts of a curtain. The form of fastening employed for this purpose is immaterial. In some uses of my fastening a hinge connection of one of the parts to a thing to be fastened may be employed.

D indicates openings or depressions in the sides of the part B of the fastening, which are preferably slightly inclined, as shown.

E indicates lugs or projections upon the sides of the part A of the fastening, extending inward and adapted to enter the openings or depressions D and being correspondingly inclined. There may be one or more of these lugs on either or both sides of the part A; but one is usually sufficient, and I have only illustrated one in the drawings, because others would be mere duplicates. The coincident inclination of the openings and lugs tends to hook and secure the parts of the fastening more firmly together and to prevent accidental unfastening.

F indicates the partitions between the openings, which are beveled on opposite sides, as shown in Figs. 2 and 3, so as to guide and facilitate the entering of the lugs to place in the openings. Furthermore, the openings are made larger at what I will call their "upper" parts $x$, and the lugs may be correspondingly shaped, which will facilitate the entering of the lugs to place and the disengagement of the parts of the fastening when desired without introducing any liability of the parts to become accidentally disengaged.

My fastening is intended to be used generally where there will be at least some slight pull or strain, tending to keep the parts in engagement; but without this I have provided for preventing the disengagement of the parts by having the outer part B fit over the inner part snugly and have a slight clamping action by the resiliency of its sides, so as to hold it in place.

In order to strengthen the inner part of the fastening, I may provide a central longitudinal rib $b$, as shown in Fig. 2; but this is not indispensable.

As illustrated in Figs. 4 and 6, the parts of the fastening may be made either straight or curvilinear, as desired, the form depending upon the use to which the fastening is to be put.

Many other variations in form may be made without departing from the substance or principle of my invention.

G indicates a slight projection, by which the outer part of the fastening may be pulled out of engagement whenever it is desired to disconnect the parts.

Although I have only mentioned metal as the substance from which my fastening is made, it can of course be made of other suitable materials—for example, horn, hard rubber, vulcanized fiber, &c. I thus produce a very simple, cheap, durable, and reliable fastening, capable of ornamentation by being given any desired exterior design, or by being colored, plated, or jeweled without interfering with its practical utility. It is also capable of a considerable range of adjustment, so that, for instance, a belt provided with it can be tightened or loosened at will, and may thus be made to fit different persons. When applied to shoe-flaps, it does away with the moving of buttons to secure a fit.

What I claim is—

1. A fastening composed of a somewhat resilient trough-shaped outer part partially inclosing an inner part, these parts being adjustable longitudinally, one with respect to the other, the inner part being provided with a series of side openings or depressions and the outer part being provided with side projections adapted to enter said openings or depressions to secure the parts together, substantially as set forth.

2. A fastening composed of a somewhat resilient trough-shaped outer part partially inclosing an inner part, these parts being adjustable longitudinally, one with respect to the other, the inner part being provided with a series of side openings or depressions largest at their tops, and the outer parts being provided with a projection on each corresponding side largest at its base and adapted to enter said openings or depressions to secure the parts together, substantially as set forth.

3. A fastening composed of a somewhat trough-shaped outer part partially inclosing an inner part, the inner part being provided with a series of side openings or depressions and the outer part being provided with corresponding side projections adapted to enter said openings and secure the parts together, the outer part having its sides somewhat resilient, so as to slightly clamp it in place over the inner part, and being provided with the projection G for pulling the parts out of engagement, substantially as set forth.

4. A fastening composed of one part that fits over and partially surrounds another part, one part being provided with a lug on one side and the other part having a corresponding side opening to receive the lug, substantially as set forth.

In testimony of all which I have hereunto subscribed my name.

HELGE ALFRED BORRESEN.

Witnesses:
J. L. MOODY,
D. W. WOODWORTH.